United States Patent
Bailie et al.

(10) Patent No.: US 6,210,456 B1
(45) Date of Patent: Apr. 3, 2001

(54) EXHAUST SYSTEM FOR DRIVE-THRU BAYS

(76) Inventors: Brian J. Bailie, 11956 Wilkinson Rd., Freeland, MI (US) 48623; J. C. Cotner, 2215 E. Salzburg Rd., Bay City, MI (US) 48706

( * ) Notice: Subject to any disclaimer, the term of this patent is extended or adjusted under 35 U.S.C. 154(b) by 0 days.

(21) Appl. No.: 09/287,494

(22) Filed: Apr. 6, 1999

Related U.S. Application Data
(60) Provisional application No. 60/081,108, filed on Apr. 8, 1998.

(51) Int. Cl.[7] .................................................. B01D 35/02
(52) U.S. Cl. ................ 55/385.1; 55/473; 55/DIG. 30; 454/49
(58) Field of Search ............... 55/385.1, DIG. 30, 55/467, 473; 454/49, 63, 64, 166, 167

(56) References Cited

U.S. PATENT DOCUMENTS 2,285,387 * 6/1942 Bartholomai ...................... 454/167
5,113,749 * 5/1992 Perbix ................................... 454/193

OTHER PUBLICATIONS 5 pp. *Aerospace America* Bay City, Michigan.

* cited by examiner

*Primary Examiner*—David A. Simmons
*Assistant Examiner*—Robert A. Hopkins
(74) *Attorney, Agent, or Firm*—Reising, Ethington, Barnes, Kisselle, Learman & McCulloch, P.C.

(57) ABSTRACT

The exhaust system for a drive-thru bay has an elongated suction tube member at one side of a driveway that is parallel to and elevated from the driveway. Wing members are attached to the elongated suction tube to form a channel member with an open side that faces toward the driveway. Apertures through the base of the channel connect the channel to the suction tube. A blower inlet pipe connects the suction tube to a blower. A discharge pipe carries gas away from the blower and discharges the gas into the atmosphere. Filters and converters can be provided in the inlet pipe or the discharge pipe. A pipe with inlet apertures rings a service opening and is connected to the blower inlet.

11 Claims, 6 Drawing Sheets

EXHAUST SYSTEM FOR DRIVE-THRU BAYS

This application claims the benefit of U.S. Provisional Application No. 06/081,108 Apr. 8, 1998.

TECHNICAL FIELD

This invention relates to an exhaust system for capturing exhaust gases from motor vehicles and more particularly to an exhaust system that captures vehicle exhaust gases to protect people working adjacent to vehicle drive-thru bays. The disclosure incorporates exhaust system for drive-thru bays disclosed in provisional patent application Serial No. 60/081,108, filed Apr. 8, 1998, whose priority is claimed for this application.

BACKGROUND OF THE INVENTION

Vehicle drive-thru bays have become very popular in recent years. They are used by restaurants, laundries, banks, grocery stores and other businesses to provide improved service to the public. Drive-thru bays are also used by government agencies for highway toll collections, bridge tolls, immigration inspections, customs inspection and access to secure facilities. The people who serve the public in these drive-thru bays are exposed to heat and exhaust gases from vehicles passing through the bays. These exhaust gases and the heat from vehicles cause discomfort, entrain particulate matter and dirt, and include objectionable constituents such as carbon monoxide, lead, sulfuric acid, nitrates and other products of combustion.

Systems that remove exhaust gases, from vehicles running in service bays, are well known. These systems have a pipe that is connected directly to the vehicle exhaust system discharge. A blower in the system has its intake connected to the system pipe that is connected to the vehicle. The blower discharge pipe discharges exhaust gases at a location some distance from the service bay and usually outside the building housing the service bay. Such systems are used only where the vehicle that is being serviced will remain in the service bay for a substantial period of time and the engine will run during a portion of the service work. The heat from the radiator and vehicle exhaust system leaks are not sucked into the blower inlet.

Bays for large vehicles such as railway engines are usually equipped with a hood and blower system above the engine or a slot in the roof for the passage of exhaust gases. Both systems work relatively well. The vehicle exhaust discharge is vertically upward. A large volume of hot gases generally continues to move upward through a slot in the roof or into an overhead hood where it is picked up by a blower. The blower blows the exhaust through a conduit and discharges the exhaust outside the building.

Drive-thru bays at drive-in restaurants, laundries, banks, grocery stores, highway toll booths, immigration inspection stations, customs inspection stations, security check stations at secure facilities and other similar facilities generally rely upon wind and atmospheric conditions to disperse hot gases and engine exhaust gases. On a windy day exhaust gases are generally blown away quickly. On some occasions, the wind may blow exhaust gases and hot air into the area where people are working adjacent to drive-thru bays and into vehicles in bays with windows down while making their transactions.

There are periods of time when wind and atmospheric conditions do not dissipate heat and exhaust gases from a drive-thru bay. During these periods people that are required to work adjacent to drive-thru bays may be exposed to dust, airborne particulate material and vehicle exhaust gases. This exposure can cause discomfort and may over time cause adverse health problems.

SUMMARY OF THE INVENTION

An object of the invention is to protect people working near drive-thru bays from hot air, dust, particulates and exhaust gases that are discharged from or disturbed by vehicles passing through the bays.

Another object of the invention is to capture a portion of the gases and other materials discharged by vehicles passing through a drive-thru bay and discharge the gases and other materials where it will not harm people, animals or property.

A further object of the invention is to provide an exhaust gas system, that can be installed in existing vehicle drive-thru bays, to capture and remove gases and solids discharged by vehicles passing through the bays.

A still further object of the invention is to capture vehicle exhaust gases in a drive-thru bay and convert harmful gases to non-harmful gases.

The exhaust system includes a suction tube with gas inlet slots or apertures on at least one side of a vehicle drive-thru bay. A channel is formed adjacent to the suction tube. The channel has an open side that faces toward the bay and vehicles in the bay. This channel captures gases and heat discharged from vehicles and holds the captured gases until they are sucked through gas inlet slots or apertures and into the suction tube.

The suction tube is connected to the inlet of a blower. The blower discharge is connected to a stack which discharges the gases, heat and solids from the blower discharge into the atmosphere where it mixes with atmospheric air.

The gas discharged by the blower can be passed through a filter to remove solids. The gas can also pass through a converter which converts harmful gases to non-harmful gases. The cleansed gas discharged from the converter is then discharged into the atmosphere.

BRIEF DESCRIPTION OF THE DRAWINGS

The presently preferred embodiments of the invention are disclosed in the following description and in the accompanying drawings, wherein.

DESCRIPTION OF THE PREFERRED EMBODIMENT

The exhaust system for drive-thru bays is designed to fit the bay in which it is mounted. Some drive-thru bays have guard rails on one or both sides of the bay. The exhaust system for such bays with guard rails may be built into the guard rail. The exhaust systems for drive-thru bays without guard rails must be stand alone systems.

Figure 1:
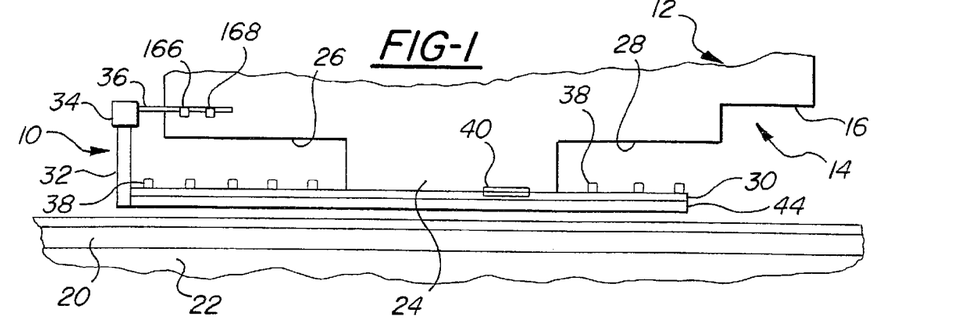
FIG. 1 is a plan view of a drive-thru bay, a building with parts broken away, a service window and an exhaust system.
Figure 2:
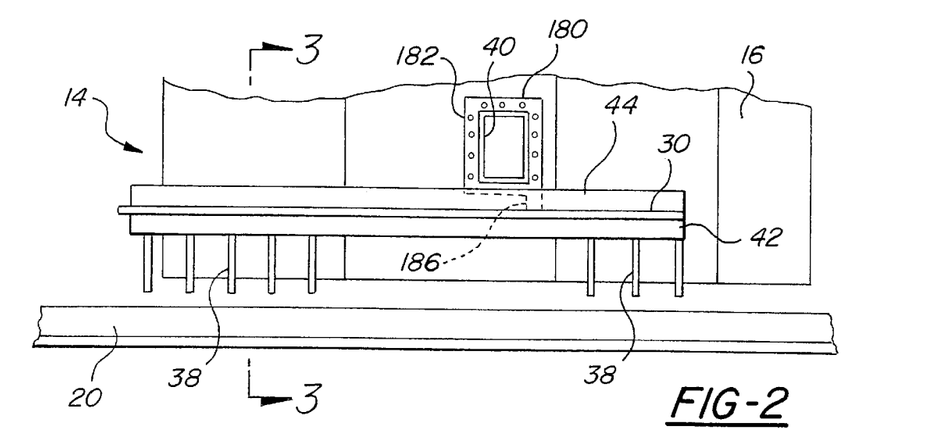
FIG. 2 is an elevational view of a drive-thru bay of FIG. 1.

An exhaust gas system 10 for drive-thru bays without guard rails is shown in FIGS. 1 and 2. These are the types of bays that would be found at a drive-thru restaurant 12 or other drive-thru facilities with a building 14 having walls 16. The bay 18 has a curb and gutter 20 that keeps vehicles from colliding with the building 14. A paved driveway 22 supports vehicles using the bay 18.

The walls 16 of the building 14 has a wall portion 24 that is spaced a short distance from the curb and gutter 20 and set back wall portions 26 and 28 as shown in FIGS. 1 and 2. The set back wall portions 26 and 28 are optional and are not found in all buildings with drive-thru bays 18. A service window 40 is provided in the wall portion 24. The bottom of the window is preferably at about the same elevation as the bottom of vehicle windows of the lowest vehicles that frequently use the bay 18.

The exhaust system 10, shown in FIGS. 1 and 2, has a suction tube 30 connected to a blower inlet pipe 32 and a blower 34. A discharge pipe 36 is connected to the blower 34 and discharges hot gases, vehicle exhaust gases, ambient air, dust, particulate material and other gases. These gases and solids are discharged in an area which will keep the gases away from people working near the bay 18.

The suction tube 30 is connected directly to the wall portion 24 that is spaced a short distance from the curb and gutter 20. In areas where the wall portions 26 and 28 are set back from the curb and gutter 20, the suction tube 30 is attached to and supported by posts 38. These posts 38 and the wall portion 24 support the suction tube 30 above the curb and gutter 20, below the service window 40, and parallel to the curb and gutter and the path of vehicles moving through the bay 18.

Figure 3:
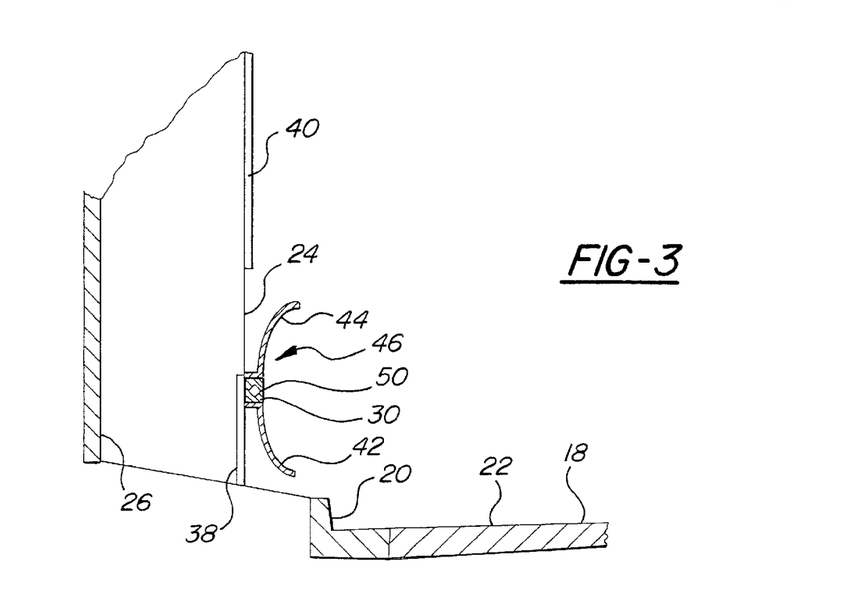
FIG. 3 is a sectional view taken along line 3—3 in FIG. 2.

A pair of wing members 42 and 44 are attached to the suction tube 30 and form a large channel shaped structure or shroud extending the length of the suction tube. The suction tube 30 is at the base of the channel 46 formed by the suction tube and two wing members 42 and 44. The channel 46 with an open side facing toward the bay 18, catches vehicle exhaust gases and other contaminants, holds these gases, and directs the gases into the intake passages in the suction tube 30. These gases, when discharged from a vehicle, enter the channel 46, spread out along the length of the channel and remain within the channel until they are sucked into the suction tube 30.

Figure 4:
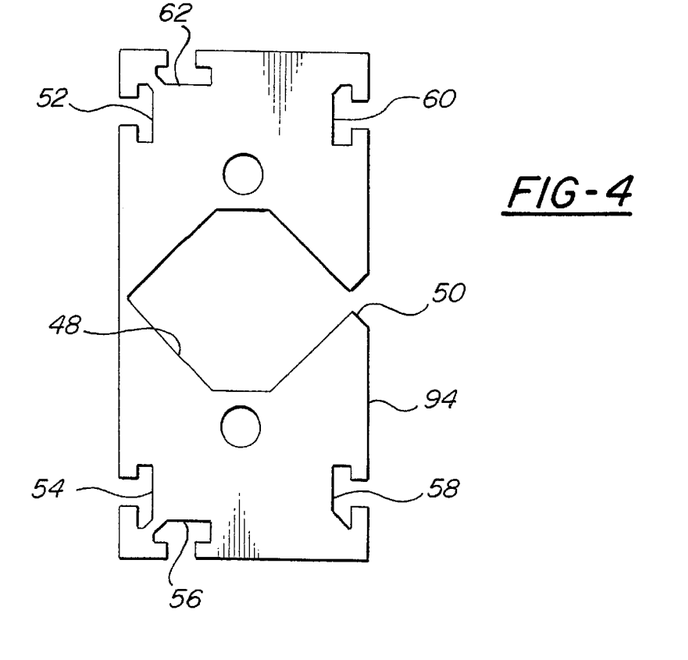
FIG. 4 is an enlarged sectional view of the suction tube of FIG. 1.
Figure 5:
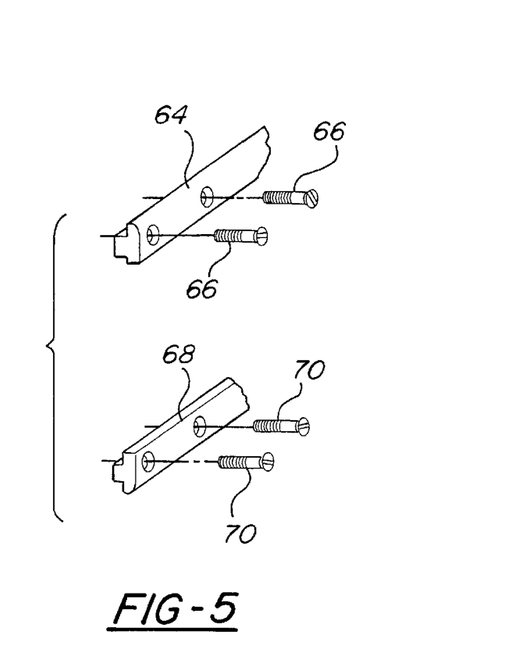
FIG. 5 is a perspective view of a pair of suction tube mounting rails.
Figure 6:
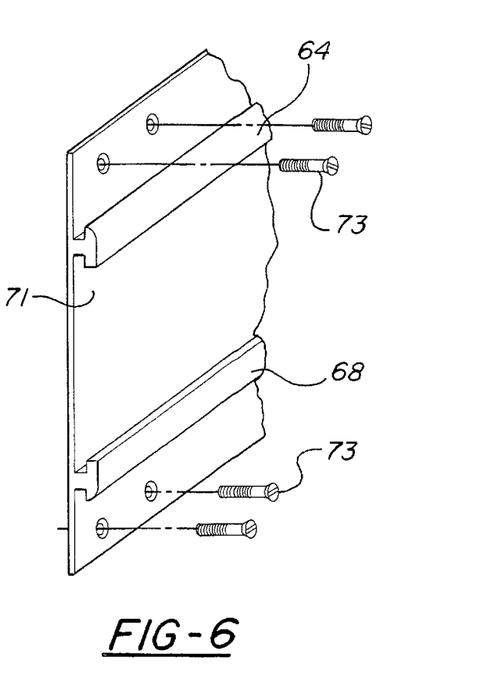
FIG. 6 is a perspective view of an alternate suction tube mounting rail.

The suction tube 30 can take many forms. As shown in FIG. 4, the suction tube 30 is an extruded member with a central passage 48, gas inlet slot 50 and generally T-shaped mounting slots 52, 54, 56, 58, 60 and 62. The slots 52 and 54 are used for mounting the suction tube 30 on a wall portion 24 of a building and on posts 38. The slot 52 may telescopically receive a top rail 64 with sections attached to the wall portion 24 and to the posts 38 by screws 66. The slot 54 telescopically receives a bottom rail 68 with sections attached to the wall portion 24 and to the posts 38 below the top rail 64 by screws 70. If desired the top rail 64 and the bottom rail 68 could be connected to each other to simplify installation as shown in FIG. 6. These rails 64 and 68 are secured to a plate 71. The plate 71 is attached to buildings 14 and posts 38 by screws 73.

Figure 7:
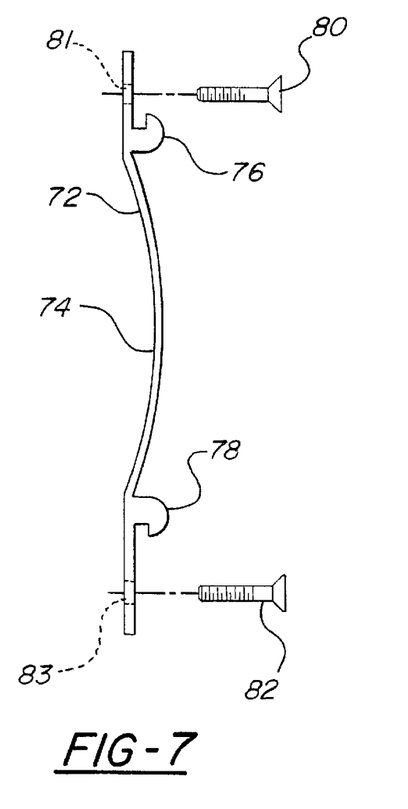
FIG. 7 is a perspective view of snap-in mounting rails.

An alternate connector 72, shown in FIG. 7, for connecting the suction tube 30 to a wall portion 24 and to posts 38 includes a spring steel plate 74 with an upper hook 76 and a lower hook 78. Screws 80 and 82 connect the plate 74 to buildings 14 and posts 38. The upper screws 80 pass through round apertures 81 in the plate 74. The screws 82 pass through vertical slots 83 in the plate 74. To attach the suction tube 30 to the connector 72, the mounting slot 52 receives the upper hook 76. The suction tube 30 is then rotated to move the mounting slots 54 into contact with the lower hook 78, cam the lower hook upwards and allow the lower hook to snap into locking engagement within the mounting slot 54.

Figure 8:
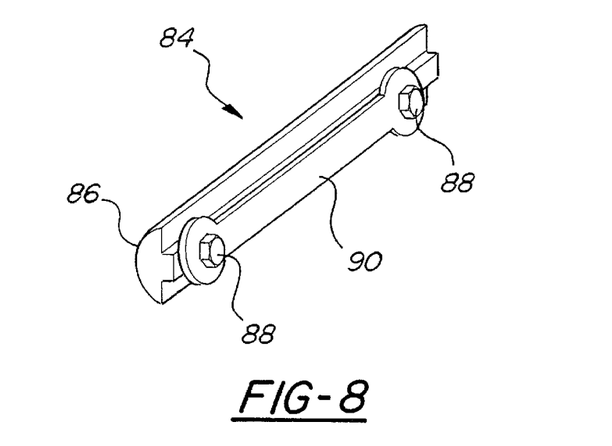
FIG. 8 is a perspective view of suction tube section connectors.

The suction tube 30 is generally formed by a plurality of suction tube sections. These sections are connected together by connectors 84 shown in FIG. 8. Each of these connectors 84 includes a T-shaped member 86 that is telescopically received in the mounting slots 56 of two adjacent tube sections or the mounting slots 62 of two adjacent tube sections. Bolts 88 pass through a strap 90, into two adjacent slots 56 or 62 and screw into each T-shaped member 86. The bolts 88 are tightened to clamp two sections of suction tube 30 together. Seals are not required to seal the joint but could be added if desired.

Figure 9:
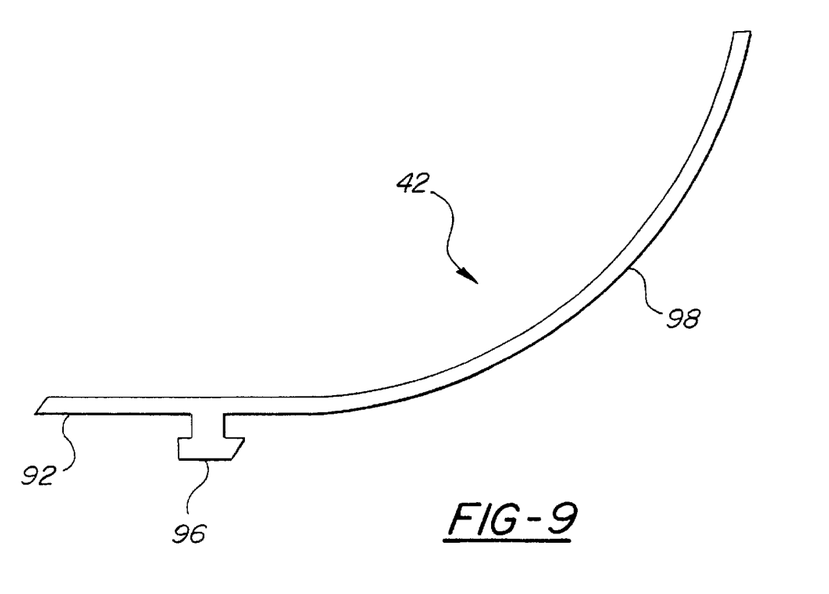
FIG. 9 is an enlarged sectional view of a wing member.

Wing members 42 and 44 as shown in FIG. 9 have a flat mounting surface 92 that engages a surface 94 of a suction tube 30, a T-shaped mounting flange 96 and an arcuate portion 98. The mounting flange 96 is telescopically received in the mounting slot 58 with the mounting surface 92 in contact with the surface 94 on the suction tube 30 to form the wing member 42. A wing member identical to the wing member 42 is turned 180° and the mounting flange 96 is telescopically received in the mounting slot 60 to form the wing member 44.

The wing members 42 and 44 may be molded or extruded from a resin that produces a flexible plastic material that can be bent out of shape and will spring back into shape once a deforming force is removed.

Figure 10:
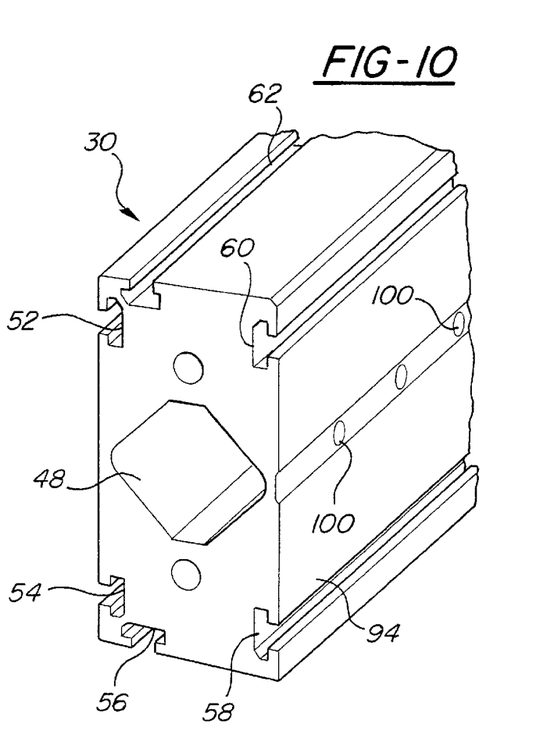
FIG. 10 is an enlarged perspective view of a modified suction tube.

As described above the suction tube 30 has an inlet slot 50. The slot 50 could be replaced by round inlet apertures 100 as shown in FIG. 10. If the suction tube 30 is relatively long it may be desirable to have round apertures 100 near the connection to the blower inlet pipe 32 and a slot 50 further from the blower inlet pipe 32 to obtain relatively even air flow into the suction tube from one end of the suction tube to the other end. If the suction tube 30 is exceptionally long, both ends of the suction tube 30 can be connected to the blower inlet pipe 32. It is also possible to connect a center portion of the suction tube 30 to the blower inlet pipe 32.

Figure 11:
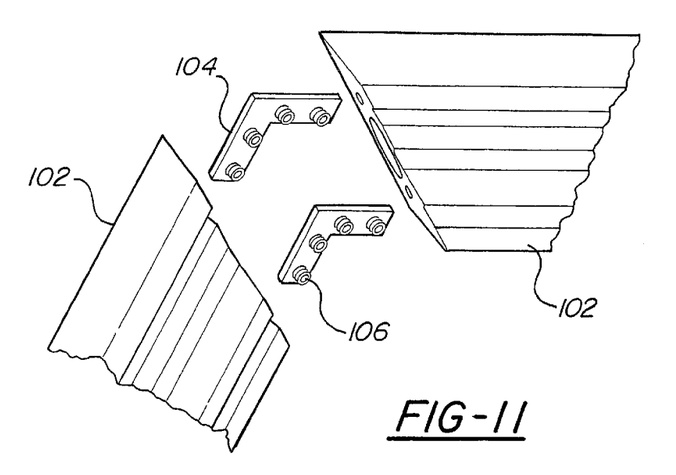
FIG. 11 is a perspective view of connector tubes for connecting two section tubes where there is a break in the suction tubes for a door.

Toll collector booths, customs inspection booths, security inspection booths and other booths that are adjacent to motor vehicle drive-thru bays may have a door rather than a service window 40. If there is a door, the suction tube 30 must be routed around the door. Tube sections 102, shown in FIG. 11, with 45° end cuts and no inlet slot 50 or inlet apertures 100 can be used to go up over the door or down under the door to prevent blocking the door. The tube sections 102 can be connected together with 90° connector assemblies 104. These connector assemblies 104 are inserted into chosen mounting slots 52–62 and clamped in place by bolts 106.

The suction tube 30 as described above is an extruded member with integral mounting slots and other unique features specifically for the drive-thru bay exhaust gas system 10. The employment of an extruded suction tube reduces installation time to a minimum at the construction site. Standard structural members that are round, square, rectangular or another acceptable shape may be used for a suction tube in place of the extruded suction tube 30. With a standard structural member for a suction tube, there is greater flexibility to design the exhaust system to fit an existing drive-thru bay. However on site installation time may be increased.

Figure 12:
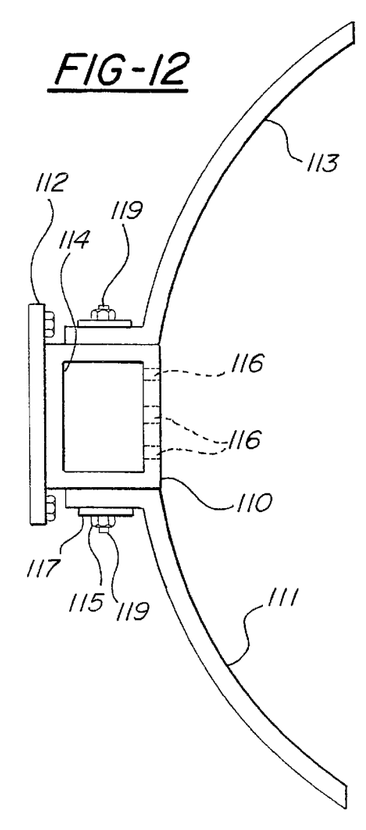
FIG. 12 is an enlarged sectional view of an alternative suction tube with wing members similar to FIG. 3.

FIG. 12 discloses a standard rectangular suction tube 110 with mounting brackets 112 welded to the back wall 114. Exhaust gas inlet slots 116 are cut through the front wall 118. Wing members 111 and 113, that perform the same function as the wing members 42 and 44 described above, are attached to the suction tube 110 by nuts 115 and washers 117 on studs 119. The studs 119 are welded to the suction tube. The mounting brackets 112 are attached to walls 24 or posts 38 using standard fasteners. The standard tube 110 may be connected directly to some drive-thru bays without the use of mounting brackets.

Figure 13:
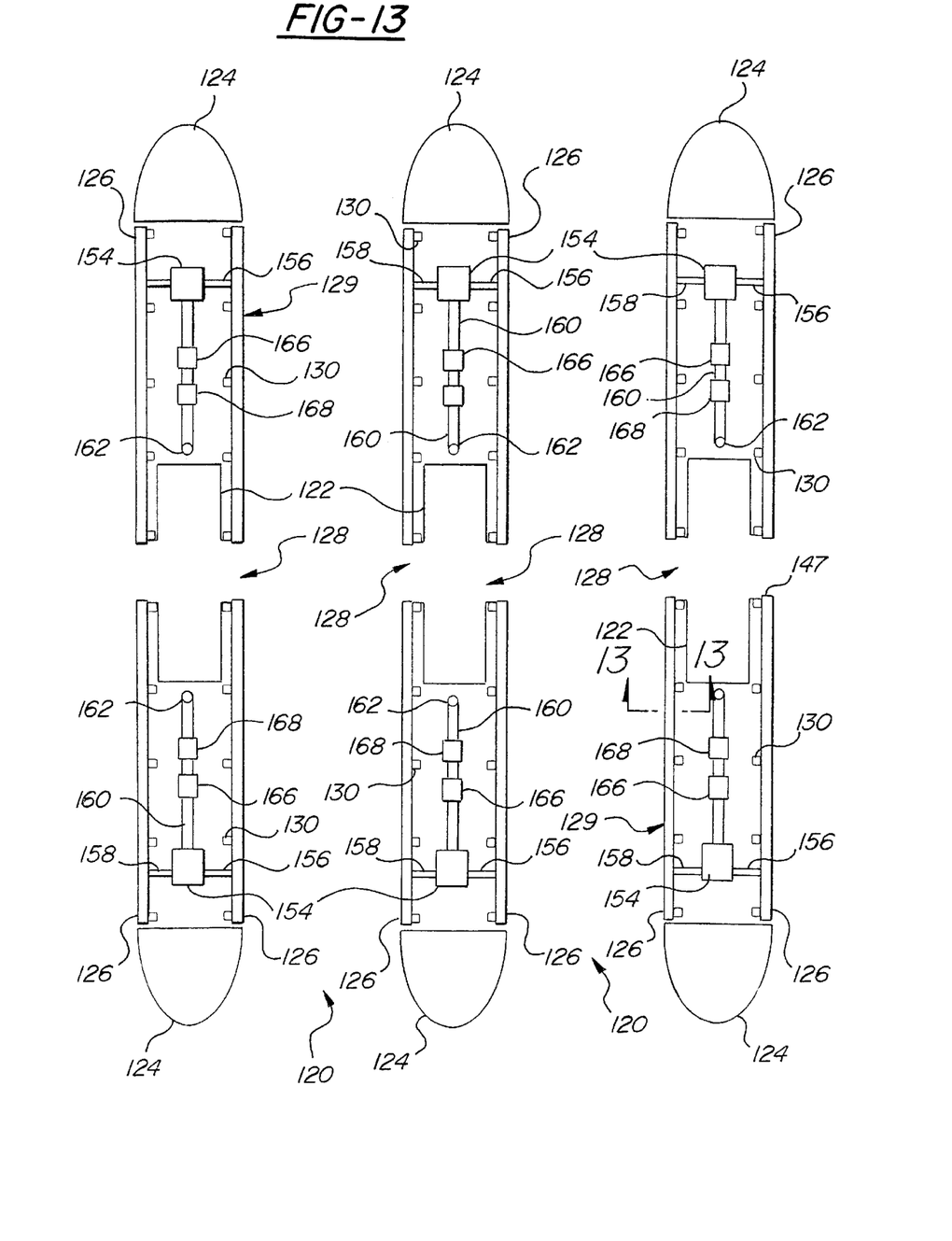
FIG. 13 is a plan view of multiple drive-thru bays with guard rails and an exhaust system.

Vehicle drive-thru bays or lanes used for toll collections, immigration and custom inspections, large parking lot fee collections, and other similar purposes have plural drive-thru lanes or bays 120 with booths 122 for officials between the lanes as shown in FIG. 13. The booths 122 are generally protected by a concrete barrier 124 at the beginning of each lane or bay 120. Steel guard rails 126 extend from the concrete barrier 124 to the door 128 of the booth 122 and from the rear side of the door past the booth 122. There may also be concrete barriers 124 at the exit ends of the bays 120. Steel guard rails 126 are generally positioned at about the proper height for the suction tube 30 described above. As a result the suction tube 30 with the wing members 42 and 44 described above is generally not usable.

Figure 14:
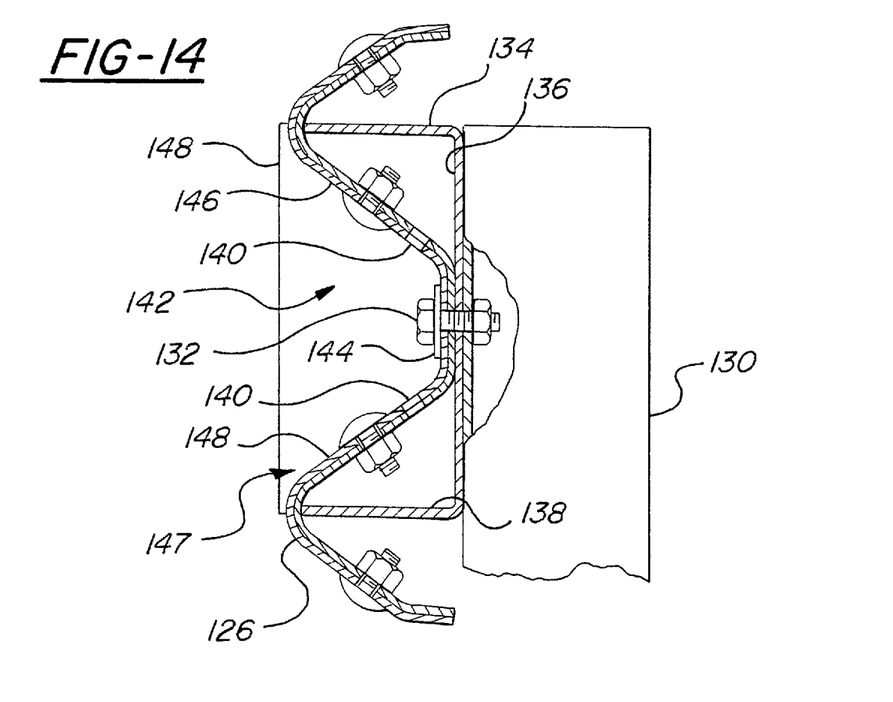
FIG. 14 is an enlarged sectional view taken along line 14—14 in FIG. 13.

The steel guard rails 126 can generally be modified to form a portion of the drive-thru bay exhaust system 129. Each guard rail 126 is mounted on a plurality of vertical steel posts 130, that are embedded in the ground and in concrete, by bolts 132. A channel member 134 is mounted on the back side of the guard rail 126 and held in place by the bolts 132 that attach the guard rail to the post 130. The channel member 134 cooperates with the guard rail 126 to form two passages 136 and 138 for exhaust gases. Exhaust gas inlet slots 140 are cut into the guard rail 126 for the passage of exhaust gases from the generally V-shaped channel 142 and into the passages 136 and 138. The V-shaped channel 142 has a generally vertical base 144, an upper wall 146 that extends upwardly and outwardly from the vertical base and a lower wall 148 that extends downwardly and outwardly from the vertical base. This V-shaped channel 142 functions the same as the channel 46 formed by the suction tube 30 and the wing members 42 and 44 discussed above. End plates 147 are provided on the ends of the sections of guard rails 126 to close the ends of the passages 136 and 138 as well as the end of the V-shaped channels 142. By closing the V-shaped channels 142, gases that enter these channels tend to be retained within the channels and then sucked through the slots 140 and into the passages 136 and 138.

Figure 15:
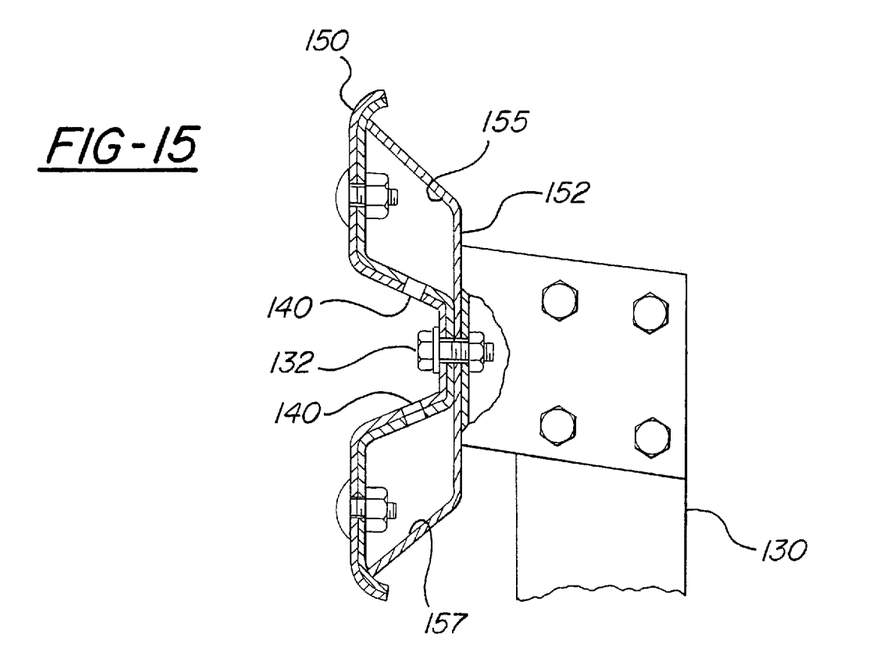
FIG. 15 is a sectional view, similar to FIG. 14, of a modified guard rail and suction tube.

Guard rails 126 vary in shape and size from one manufacturer to another. The shape of the channel member 134 is modified to accommodate the guard rails 126 that are used. FIG. 15 shows a guard rail 150 that has a different shape than the guard rails 126. The shape of the channel member 152 that cooperates with the guard rail 150, to form passages 155 and 157 for exhaust gases, is somewhat different than the shape of the channel member 134 that forms passages 136 and 138 described above.

Blowers 154, as shown in FIG. 13, have blower inlet pipes 156 and 158 that are connected to the passages 136 and 138 formed by the channel members 134 and the guard rails 126. As shown in FIG. 13 a number of blowers 154 are used. There could be fewer blowers 154 than shown or more than shown. The blower inlet pipes 156 can be connected to the ends of the passages 136 and 138 rather than the center portion as shown in FIG. 13. The blowers 154 can be mounted in remote locations rather than adjacent to the sections of guard rail 126 as shown.

The blower discharge pipes 160 are connected to vertical stacks 162 that discharge gases and other materials into the atmosphere well above the tops of the booths 122. The stacks or stack 162 will move harmful gases or other materials away from people working in the booths 122. However it may still be undesirable to discharge the gases and solids picked up by the exhaust gas systems 10 or 129 into the atmosphere. Filter units 166 can be placed in the blower discharge pipe 36 or 160 to filter solids from the gases discharged from the blowers 34 or 154. The cleaned exhaust gases that are discharged from the filter units 166 will include gases that are harmful. Converters 168 may be placed in the blower discharge pipes 36 or 160 that convert harmful gases to gases that do not harm people or property. If filters 166 or converters 168 are used, it would be desirable to collect gases and other materials collected from several bays 18 or 120 and pass these gases and other materials through one filter unit and one converter 168. Filter units 166 and converters 168 could be on the inlet side of the blower if desired. Filters 166 and/or converters 168 in the blower inlet pipe 32 or 156 would reduce requirements for sealing to prevent the escape of toxic materials.

The exhaust systems described above all employ the same method of capturing and removing vehicle exhaust gasses from drive-thru bays. Gasses, heat and entrained particulates and dust are captured and held at the side of a vehicle and between the vehicle and people working adjacent to the bay. The gasses and solids that are captured and held are then drawn into a suction tube and moved to a remote location for treatment or discharge into the atmosphere. Treatment, may include filtering to remove solids and converting objectionable constituents of the gasses into unobjectionable gasses. Following filtering and/or converting, the gasses are discharged into the atmosphere.

The exhaust system, as described above, can collect a large portion of the gases and heat discharged from a vehicle in a drive-thru bay. The gasses, entrained particulate matter and heat that is not removed by the exhaust system will be diluted, due to mixing with air, to the point that health effects will be minimized. Further protection of people who provide services and goods in drive-through bays can be obtained by placing a secondary gas collector around the service window 40 or door 128. The secondary collector will ideally pull some air through the window 40 or doorway 128 from the inside of the building 14 or booth 122, in addition to exhaust gasses outside the building or booth that are sucked in. A pipe 180 with multiple inlet apertures 182 rings the window 40 as shown in FIG. 2. The pipe 180 is connected to the suction tube 30 or the suction tube 110 by a pipe 186. The pipe 180 could be connected directly to a blower inlet pipe 32 rather than to suction tube 30 if desired. By placing the inlet apertures 182 in portions of the pipe 180 that face away from the window 40 on doorway 128, a substantial volume of air can be drawn into the pipe without interfering with services to be provided to persons in the bay 18 or 122.

The disclosed embodiments are representative of presently preferred forms of the invention, but is intended to be illustrative rather than definitive thereof. The invention is defined in the claims.

I claim:

1. An exhaust system for drive-thru vehicle bays comprising:

a building having a service opening;

a vehicle driveway extending beside the building and the service opening; a suction tube extending alongside of the vehicle driveway and between the vehicle driveway and the building, that is generally horizontal and at a higher elevation than the driveway; an elongated channel member, connected to the suction tube, having an open side that faces toward the vehicle driveway and wherein said elongated channel member is operable to catch exhaust gases, particulates and heat discharged from vehicles, and passages through the elongated channel member in communication with the suction tube; a blower inlet pipe connected to said suction tube; a blower inlet pipe connected to said suction tube; a blower having a blower inlet connected to the blower inlet pipe, and a blower discharge connected to a blower discharge pipe; and wherein the blower is operable to suck vehicle gases, particulates and heat from said elongated channel member, through passages through the elongated channel member, through the suction tube, through the blower inlet pipe, and through the blower inlet and discharge there gases, particulates and heat through the blower discharge and the blower discharge pipe.

2. An exhaust system for a drive-thru bay comprising:

a building having a service opening; a vehicle driveway extending beside the building and the service opening; an elongated generally horizontal suction tube supported between said building and said vehicle driveway; an elongated channel member connected to the suction tube and having an open side facing toward said vehicle driveway to form a vehicle exhaust collector and at least one passage connecting the opening side of said channel member to said generally horizontal suction tube; a blower having a blower inlet and a blower discharge; and a blower inlet pipe connected to the blower inlet and said elongated generally horizontal suction tube for conveying gases from the open side of said elongated channel member to the blower.

3. An exhaust system for a drive-thru bay as set forth in claim 2 wherein said elongated generally horizontal suction tube is a structural member and said elongated channel member is formed by an upper elongated wing member and a lower elongated lower wing member secured to said elongated generally horizontal suction tube.

4. An exhaust system for a drive-thru bay as set forth in claim 2 including a secondary gas collector adjacent to at least one side of the service opening and connected to the blower inlet.

5. An exhaust for a drive-thru bay as set forth in claim 2 wherein a portion of said elongated generally horizontal suction tube is supported by said building.

6. An exhaust system for a drive-thru bay as set forth in claim 2 wherein said elongated horizontal suction tube is secured to post members.

7. An exhaust system for a drive-thru bay as set forth in claim 2 including a filter connected to the blower discharge that is operable to filter gases discharged from said blower.

8. An exhaust system for a drive-thru bay as set forth in claim 2 including a converter connected to the blower discharge that is operable to clean gases collected in said elongated channel member.

9. An exhaust system for a drive-thru bay as set forth in claim 2 wherein said elongated generally horizontal suction tube has a central passage, a gas inlet slot on one side forming an inlet orifice, and at least one mounting slot for attachment to a suction tube support.

10. An exhaust system for a drive-thru bay as set forth in claim 3 wherein said structural member has at least one upper wing member mounting slot and at least one lower wing member mounting slot, and said elongated channel member is formed by an upper wing member engaging the at least one upper wing member mounting slot and a lower wing member engaging the at least one lower wing member mounting slot.

11. An exhaust system for a drive-thru bay as set forth in claim 10 wherein the upper wing member and the lower wing member are made from a flexible material.

\* \* \* \* \*